Nov. 10, 1953  E. G. MAXWELL  2,658,985
COOKING STOVE
Filed Jan. 19, 1949  2 Sheets-Sheet 1

INVENTOR,
EARL G. MAXWELL
BY Robert B. Terry
ATTORNEY.

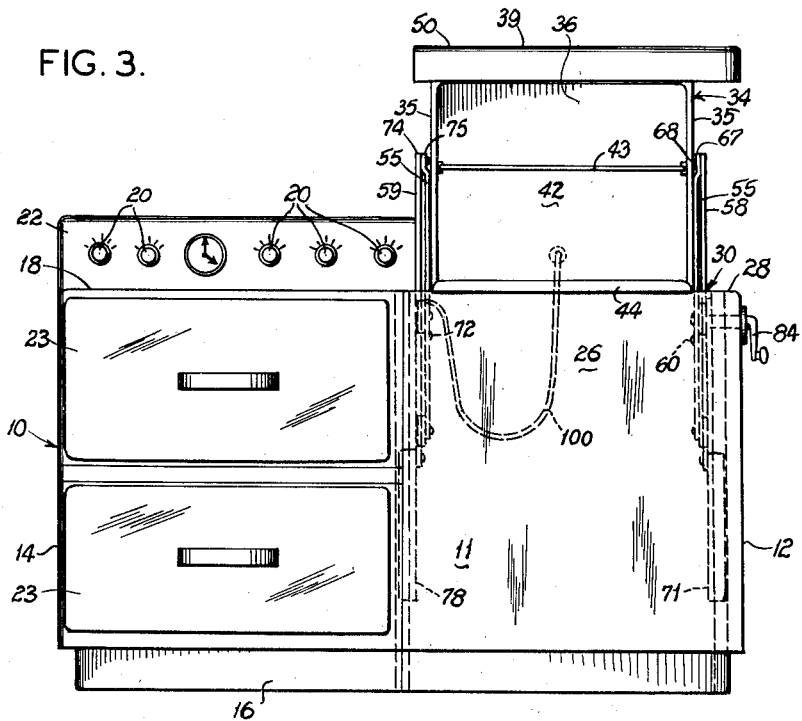
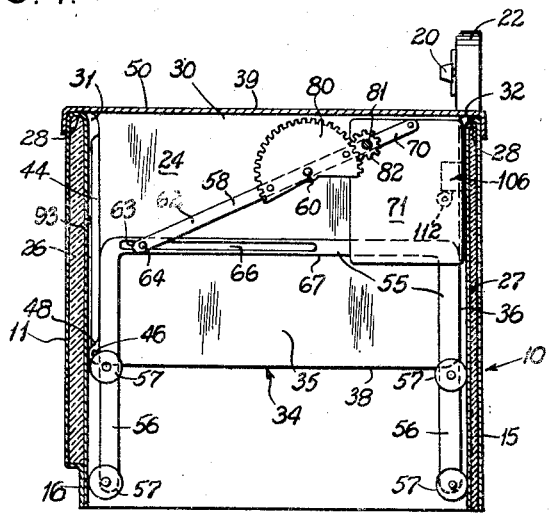
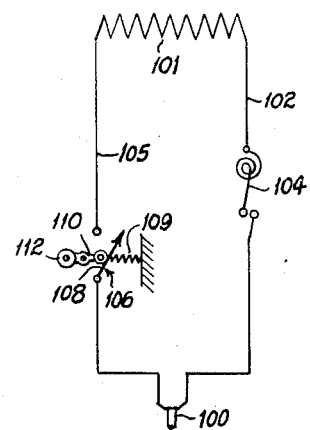
INVENTOR,
EARL G. MAXWELL
BY Robert B. Terry
ATTORNEY Patented Nov. 10, 1953

2,658,985

UNITED STATES PATENT OFFICE 2,658,985

COOKING STOVE

Earl G. Maxwell, St. Louis, Mo.

Application January 19, 1949, Serial No. 71,719

3 Claims. (Cl. 219—35)

My invention relates to cooking stoves and more particularly to improvements in ovens for such stoves. The particular character of stove and oven assembly to which the present invention is directed, is one in which the oven is embodied as a unit movable between an exposed position of use on the stove, to afford access to the oven interior, and an inoperative or concealed position with the stove body.

An object of the invention is to provide a stove having an oven-receiving well or compartment, and an oven having an access opening and including a movable closure or door for the access opening, wherein the oven is operatively supported for displacement into and out of the oven compartment in the stove.

Another object is to provide in a stove and oven arrangement according to the foregoing object, an oven having a top wall which when the oven is entered in the stove compartment or well provided therefor, lies substantially flush with the top surface of the stove.

Yet another object is to provide a stove and oven assembly of the character hereinabove indicated, which includes oven heating means and a control provision for the heating means, effective to render the latter operative only when the oven is displaced outwardly of the stove well.

Further objects and advantages will appear from the following description of a presently preferred embodiment of my invention, and from the drawings illustrating the preferred embodiment.

In the drawing:

Fig. 3 is a front elevation of the stove, showing the oven elevated and indicating in broken lines, elements of the oven support mechanism;

Fig. 4 is a view of the stove at the oven end thereof, with the end wall broken away or removed to reveal the oven well and parts of the oven assembly, the oven being shown disposed in the well, and Fig. 5 is a circuit diagram illustrating circuit connections of an electric oven heater and control provisions therefor.

Figure 1:
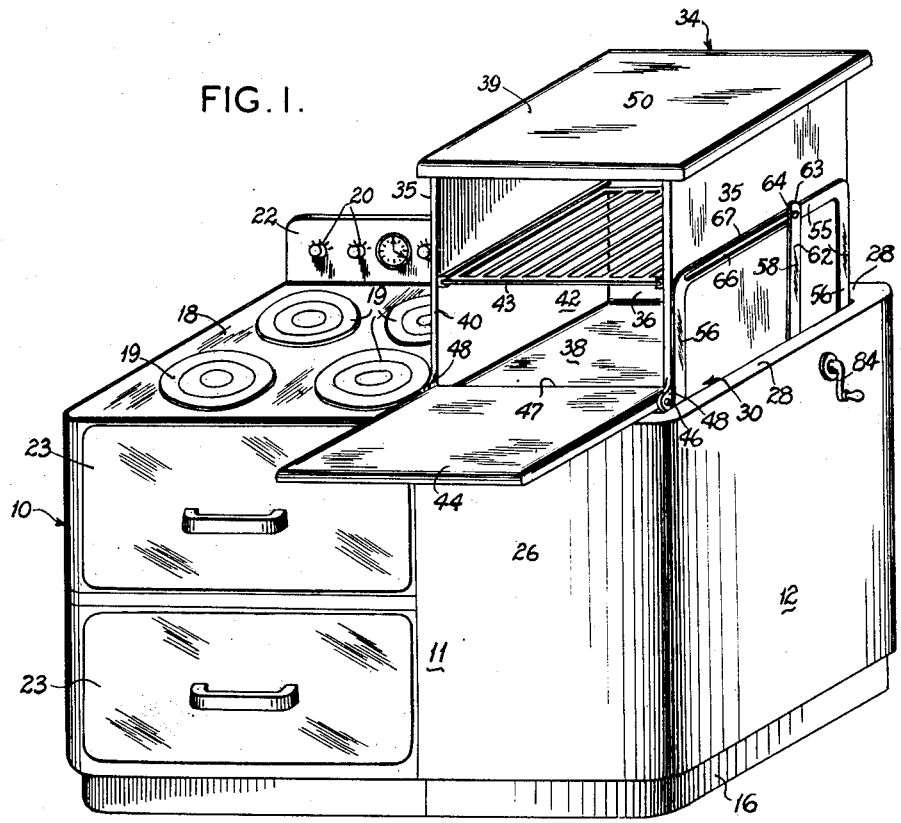
Fig. 1 is a front elevational view in perspective, of a stove embodying the present invention, the view illustrating the oven in its exposed or elevated position with the oven door open to expose the access opening of the oven.

Referring to the drawings and first to the perspective view of Fig. 1, illustrated is a cooking stove comprising a body 10 presenting a front wall 11, end wall 12, opopsite end wall 14 (Fig. 3), and a rear wall 15 (Fig. 2), all extending vertically above a recessed base 16. The body further includes a top horizontal wall 18 providing a portion of the top surface of the stove, wall 18 extending over approximately one-half the length of the stove between its end walls and being apertured to accommodate burner grates or heating plates 19. By present preference, the stove shown is an electric stove, so that plates 19 may be of conventional resistance coil type, and controlled through the usual switches or rheostats (not shown) operated by the knobs 20 on a back control panel 22. In the body below the heating plate section of the stove top wall, may be located storage compartments or drawers as indicated by the handled end members 23.

In the right hand end section of the stove body 10 is an oven-receiving compartment or well 24 (Fig. 4) defined by the end wall 12, the wall portion 26 of front wall 11 and wall portion 27 of rear wall 15. The upper horizontal margins 28 of these wall elements, together with the right hand margin of the stove top wall 18 (Fig. 1), define the upper open end 30 of the oven well, the wall margins 28 preferably being curved or beveled inwardly and downwardly for a purpose to appear. Such bevelling is indicated at 31 in the margin 28 of front wall portion 26, and at 32 in the similar margin of the rear wall portion 27, both shown in Fig. 4.

Adapted for reception in the oven well 24 is an oven unit designated generally by the reference character 34. As appears more particularly in Fig. 1, the oven comprises a box-like unit formed by side walls 35, back wall 36, bottom wall 38 and a top wall 39. The forward or front side of the oven is open to afford an access opening 40 giving access to the oven interior 42. Within the oven may be one or more grid-like supports or trays, such as the tray 43 shown. Completing the oven unit is a closure member or door 44 for the open side or access opening 40, the door having a pivot or hinge pin 46 at each end of its bottom margin 47, the pins pivotally seating in apertured lugs or ears 48 outstanding on the forward margins of the oven side walls 35 near the lower ends of the margins.

As will be observed from the several views, the top wall 39 of the oven projects beyond or overhangs the side walls and back wall as well as the forward open side of the oven. Thus, with door 44 in closed position and the oven unit lowered in the oven well 24, the projecting margins of the top wall 39 will engage and seat on the margins 28 of the body walls defining the well, as this is illustrated in Fig. 4, such that the top surface 50 of wall 39 will be substantially flush with the top surface of the stove top wall 13. Moreover, marginal engagement of the top wall 39 with the wall margins 28 serves to limit the extent of oven displacement downwardly in the well, as well as to augment oven support when the oven is positioned in the well.

The oven unit is operatively supported relative to the stove body 10 for positionment in or out of the oven well 24, by relatively simple yet highly effective means now to be described. Suitably secured externally to each side wall 35 of the oven unit, is a bracket or frame member 55 of inverted U-shape, the legs 56 of which extend a suitable distance below the oven bottom. Carried on the legs 56 are rollers 57, those on the rear legs engaging the back wall portion 27 of the stove body 10, while those on the front legs similarly engage the front wall portion 26 of body 10. These rollers serve to position and guide the oven unit in its displacement, constraining the oven to a substantially straightline vertical movement relative to the well.

Operatively supporting the oven on the stove body are a pair of bars or arms 58 and 59, the arm 58 (Figs. 1, 2 and 4) being pivotally mounted intermediate its ends at 60, to the end wall 12 of body 10. The longer section 62 of the arm has at its free end 63, a pin 64 extending through an elongate slot 66 provided in the crosspiece 67 of the frame member 55 on oven wall 35. Preferably the pin 64 has a head 68 (Fig. 3) engaging the rear of cross-piece 67 to retain the arm and pin in connection with the cross-piece. Pivotally supported in pendant relation at the free end of the shorter section 70 of arm 58, is a weight member 71 provided to counterbalance the weight of the oven unit, the weight being relatively thin and located closely adjacent the body wall 12, such that it may move between wall 12 and the adjacent wall 35 of the oven, as the oven is displaced into or out of the well.

Supporting the oven at its opposite side is the arm 59 (Fig. 3) which is pivoted intermediate its ends at 72, to a frame member (not shown) of the stove body 10. Arm 59 may be exactly like arm 58, and is connected at its free end 74, to the adjacent cross-piece 75 of U-bracket 55 on the left side wall 35 of the oven, by a pin and slot arrangement as shown and described for the arm 58. Similarly, pivotally pendant on the opposite end 76 of the arm 59 is a counterbalance weight 78 corresponding to the weight 71. The combined weight of the weight members is such that the effect thereof, acting through the pivoted arms 58 and 59 on the oven unit, is to balance substantially the unloaded weight of the oven assembly.

Figure 2:
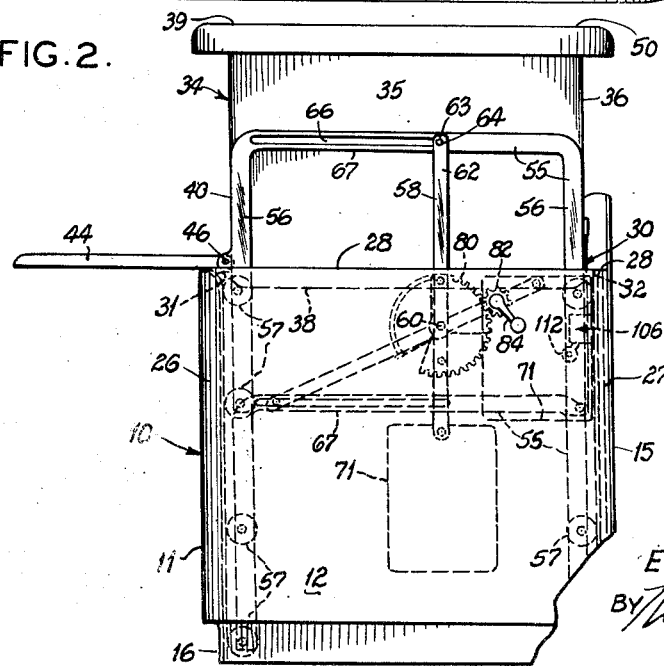
Fig. 2 is an end elevation of the stove at the oven end thereof, showing the oven elevated and illustrating in broken lines, portions of the oven supporting and operating mechanism.

Actuation of the arms 58 and 59 to effect elevation and lowering of the oven relative to the well 24, is here effected preferably through arm 58, as by a manually operated crank gear device. A mutilated or incomplete gear element 80 is secured to arm 58 with the gear center or axis coincident with the axis of the arm pivot 60. Journalled in an opening through end wall 12 of the stove body 10 is a shaft element 81, the shaft having fixed thereon a pinion 82 engaging the gear 80. On the shaft externally of the wall 12 is a crank 84 for manual operation of the shaft and pinion to turn the gear 80 and therewith, the arm 58. Thus rotation of arm 58 in one direction, with the arm 59 rotating correspondingly, will serve to lower the oven into the well, as to the limit shown in Fig. 4. Arm rotation in the opposite or clockwise direction as viewed in Fig. 4, then will produce elevation of the oven to the exposed position shown in Fig. 2, limited thereto by the vertical position of the arm 58 then obtaining, in which position the pin 64 may abut one end of the slot 66 to prevent further turning of the arm in the clockwise direction (Fig. 2).

In the raised position of the oven, the hinge pins of the door will be near or substantially opposite the bevelled upper margin 28 of the body wall section 26. Thus, the upper margin 28 of wall 26 will not prevent or interfere with door opening, and in fact may serve as a door rest when the door is open.

It is to be noted that the point of door rest on the wall margin 28 is along an area of the door which is relatively close to the axis of the hinge pins near the inner or bottom door margin 47. Consequently, the door in its open position, has the major portion thereof outwardly beyond the wall margin 28, so that by reason of the weight of the overhanging door portion, the door in effect, constitutes a lever which, acting through the wall margin 28 as a fulcrum, tends to hold the oven in its elevated position. This action of the door when open, serves in some material measure, to relieve the oven supporting strain on the arms 58 and 59.

Upon lowering of the oven into body well 24, in case the door is inadvertently left open, the bevelled margin 28 of wall 26 serves as a cam abutment with respect to the door 44, causing the latter to pivot upwardly toward closed position. As the oven continues downwardly, the door fully closes and becomes constrained to full-closed position by reason of the close proximity of the inner surface 93 of wall 26 to the outer face of the door (Fig. 4).

As hereinbefore indicated, the stove according to the present example, is an electric stove having resistance heater plates shown at 19 in Fig. 1. The oven unit therefore, embodies a resistance heater and control elements in a circuit as illustrated in Fig. 5, supplied with electric current through a supply conductor cord 100 of flexible nature (Fig. 3) and of a length to accommodate the full extent of oven displacement. With reference to Fig. 5, the oven resistance heater is indicated at 101. To one end of the resistance heater 101 is connected a lead 102 extending from one conductor of duplex cord 100, the lead including a thermostatic switch 104 which may be of conventional construction, affording oven temperature control in a well known manner. The opposite end of resistance 101 is connected with the remaining conductor in cord 100, by a lead 105 which includes therein, a control switch 106. Switch 106 is by preference, of a character having its movable contact 108 normally urged to circuit closing position as by a compression spring 109 or equivalent means. In application to the oven, the switch 106 is located somewhat below the top of the path of movement of the oven (Fig. 4) and includes a switch-actuating element 110 thereof including a roller 112 exposed for engagement by a fixed part of the movable oven. The projection such as roller 112 is located such that as the oven is positioned in the body well, the oven acts to hold in open-circuit position the switch contact 108 against the compression of spring 109. With switch 106 closed, the heater circuit becomes operative under control of the thermostat switch 104. It will be apparent now that upon elevating displacement of the oven, to or near its fully raised position, the arm 110 and roller 112 will be cleared by the oven so that the switch will close. Hence it is only in a substantially uppermost oven position that it will be serviceable for baking purposes.

While the present invention is herein shown and described in application to an electric stove, it will be now appreciated that the same may be embodied readily in a gas stove. In such case, the gas burner of the oven unit may be controlled by a conventional or well known form of thermostatic valve unit providing oven temperature regulation, and additionally by a spring-actuated shut-off valve in the burner supply line. The latter, serving the purpose of the switch 106 in the electric heater circuit herein described, may be located in the place of switch 106, and so arranged that a spring pressed valve stem is engaged by the oven to close the valve, but is spring-opened when the oven clears the valve stem.

Having now illustrated and described a presently preferred embodiment of my invention, it is to be understood that modifications may be made with respect to the assembly, its parts and arrangement of parts, all without departing from the spirit and full intended scope of the invention as hereinafter claimed.

I claim:

1. In a cooking stove, a rising oven assembly comprising a fixed enclosure formed to provide a top-open oven-receiving chamber, an oven movable vertically into and out of said chamber, said oven having a front access opening, a door for said opening, means for heating said oven, electrical means for controlling a source of oven heat, said control means including a control switch provided with an enclosure and carried by an upper rear wall portion of said fixed enclosure, mechanism at each side of the oven proper, but within the fixed enclosure therefor, for raising and lowering the oven out of and into said enclosure, and providing a fixed path of raising and lowering oven movement, said switch including a movable switch arm, and being located at a point immediately below the lowermost portion of the oven when the latter is in an uppermost or fully raised position, the oven controlling means including a control circuit at least one leg of which includes said switch, said switch being of self-closing type, and the switch arm being located in the path of movement of a rear portion of the oven proper, the location of the switch and switch arm being such that said switch may be closed, and hence the oven heating means energized, only when the oven is in a substantially fully raised position, and further such that near the start of a descending movement of the oven, the switch arm is engaged thereby to hold the switch open whereby to assure cessation of oven heat substantially in all oven positions except when fully elevated.

2. In a cooking stove, a rising oven assembly comprising a fixed enclosure formed to provide a top-open oven-receiving chamber, an oven movable vertically into and out of said chamber, means for raising and lowering the oven, means for heating the oven, and control means for regulating the source of oven heat, said control means including a fixed element and a coacting actuating element engageable by said fixed element and adapted to cause energization and de-energization of the oven heating means, one of said elements being carried by the fixed enclosure, the other said element being carried by the oven proper, the location of said elements being such that the actuating element acts to energize the oven heating means only when the oven is in a substantially fully raised position, and further located such that near the start of a descending movement of the oven, the fixed element coacts with the actuating element to assure cessation of oven heat substantially in all oven positions except when fully elevated.

3. In a cooking stove, a rising oven assembly comprising a fixed enclosure formed to provide a top-open oven-receiving chamber, an oven movable vertically into and out of said chamber, means for raising and lowering the oven, means for heating the oven, and electrical control means for regulating the source of oven heat, said control means including a fixed element and a control switch element, one of said elements being carried by the fixed enclosure, the other said element being carried by the oven proper, the switch element having a movable switch-actuating arm engageable by the fixed element and adapted to cause energization and de-energization of the oven heating means, the location of the switch element and switch-actuating arm being such that said switch element may be closed, and hence the oven heating means energized, only when the oven is in a substantially fully raised position, and further located such that near the start of a descending movement of the oven, the switch-actuating arm is engaged by the fixed element to hold the switch open whereby to assure cessation of oven heat substantially in all oven positions except when fully elevated.

EARL G. MAXWELL.

References Cited in the file of this patent

UNITED STATES PATENTS

| Number | Name | Date |
|---|---|---|
| 2,109,006 | Davis | Feb. 22, 1938 |
| 2,163,165 | Wise | June 20, 1939 |
| 2,180,161 | Miller | Nov. 14, 1939 |
| 2,447,364 | Renshaw | Apr. 17, 1948 |
| 2,455,154 | Bailey | Nov. 30, 1948 |
| 2,569,775 | Pearce | Oct. 2, 1951 |

FOREIGN PATENTS

| Number | Country | Date |
|---|---|---|
| 180,820 | Great Britain | June 8, 1922 |